(12) United States Patent
Hora et al.

(10) Patent No.: US 11,087,892 B2
(45) Date of Patent: Aug. 10, 2021

(54) ELIMINATION OF NEUTRONS FROM NUCLEAR REACTIONS IN A REACTOR, IN PARTICULAR CLEAN LASER BORON-11 FUSION WITHOUT SECONDARY CONTAMINATION

(71) Applicant: Heinrich Hora, Poing (DE)

(72) Inventors: Heinrich Hora, Poing (DE); Shalom Eliezer, Rehovot (IL); Noaz Nissim, Rehovot (IL)

(73) Assignee: Heinrich Hora, Poing (DE)

( * ) Notice: Subject to any disclaimer, the term of this patent is extended or adjusted under 35 U.S.C. 154(b) by 0 days.

(21) Appl. No.: 16/766,817

(22) PCT Filed: Nov. 26, 2018

(86) PCT No.: PCT/EP2018/082520
§ 371 (c)(1),
(2) Date: May 26, 2020

(87) PCT Pub. No.: WO2019/101991
PCT Pub. Date: May 31, 2019

(65) Prior Publication Data
US 2020/0321135 A1 Oct. 8, 2020

(30) Foreign Application Priority Data

Nov. 27, 2017 (DE) ..................... 10 2017 010 927.3

(51) Int. Cl.
*G21B 1/11* (2006.01)
*G21B 1/13* (2006.01)
(Continued)

(52) U.S. Cl.
CPC .................. *G21B 1/11* (2013.01); *G21B 1/13* (2013.01); *G21B 1/19* (2013.01); *G21B 1/23* (2013.01); *G21C 7/22* (2013.01); *G21C 7/24* (2013.01)

(58) Field of Classification Search
CPC ............... G21B 1/03; G21B 1/11; G21B 1/13
See application file for complete search history.

(56) References Cited

U.S. PATENT DOCUMENTS 3,216,077 A 11/1965 Marchal et al.
3,762,992 A * 10/1973 Hedstrom ................ G21B 1/03
376/103

(Continued)

FOREIGN PATENT DOCUMENTS

CH 391910 A 5/1965
DE 102012001634 A1 8/2013
(Continued)

OTHER PUBLICATIONS

Hora et al. (2015). Fusion energy using avalanche increased boron reactions for block-ignition by ultrahigh power picosecond laser pulses, Laser and Particle Beams 33, 607-619.
(Continued)

*Primary Examiner* — Sharon M Davis
(74) *Attorney, Agent, or Firm* — Caesar Rivise, PC

(57) ABSTRACT

The invention relates to a method for eliminating neutrons from fission, fusion or aneutronic nuclear reactions in a reactor (100), in particular in a laser-driven nuclear fusion reactor (100) which operates with hydrogen and the boron-11 isotope, in which method at least some moderated neutrons are made to undergo a nuclear reaction with tin (11). As a result of the nuclear reactions with tin, the neutrons convert the tin nuclei into stable nuclei having a higher atomic weight resulting from neutron capture. The invention also relates to a reactor (100) which is designed for energy
(Continued)

conversion by means of fission, fusion or aneutronic nuclear reactions and for generating electric energy, wherein the reactor contains a neutron elimination device (50) which contains tin and is arranged such that at least some moderated neutrons are made to undergo a nuclear reaction with the tin.

9 Claims, 1 Drawing Sheet

(51) Int. Cl.
    *G21B 1/19*     (2006.01)
    *G21B 1/23*     (2006.01)
    *G21C 7/22*     (2006.01)
    *G21C 7/24*     (2006.01)

(56) References Cited

U.S. PATENT DOCUMENTS

| | | | | |
|---|---|---|---|---|
| 4,182,651 | A * | 1/1980 | Fischer | G21B 1/03 376/144 |
| 6,411,666 | B1 * | 6/2002 | Woolley | G21B 1/13 376/136 |
| 6,752,972 | B1 * | 6/2004 | Fraim | G21B 1/13 422/198 |
| 2012/0002773 | A1 * | 1/2012 | Hunter, Jr. | G21B 1/17 376/102 |
| 2017/0125129 | A1 * | 5/2017 | Hora | G21D 7/00 |
| 2017/0352435 | A1 * | 12/2017 | Wong | G21B 1/13 |

FOREIGN PATENT DOCUMENTS

| | | |
|---|---|---|
| GB | 1078028 A | 8/1967 |
| WO | 2012103548 A1 | 8/2012 |
| WO | 2015021403 A1 | 2/2015 |
| WO | 2015144190 A1 | 10/2015 |
| WO | 2015166515 A2 | 11/2015 |

OTHER PUBLICATIONS

Hora. (2016). Laser plasma physics, SPIE Bellingham WA, USA, 243-273.
Hora et al. (2017). Non-thermal laser driven plasma-blocks for proton boron avalanche fusion as direct drive option, Matter and Radiation at Extremes (Elsevier) 2, 177-189.
Hora (2017). Kommentar zum Finkel-Report: Von der Australischen Regierungskommission geleitet vom Chefwissenschaftler Dr. Alan Finkel 2017 zur Energie, Report the Academy of Technological Science and Engineering (ATSE) Melbourne, Symposium Sydney.
Hora et al. (2020). About thermal and non-thermal ignition of nuclear fusion reactions, Summary of Invited Paper at Hirschegg 2020 Conference GSI Darmstadt/Germany.
Hora et al. (2020). Pressure of picosecond CPA laser pulses substitute ultrahigh thermal pressures to ignite fusion, High Energy Density Physics 35,100739.
Eliezer et al. (2016). Avalanche proton-boron fusion based on elastic nuclear collisions, Physics of Plasmas 23, 050704-1-050704-3.
Giuffrida et al. (2020). High-current stream of energetic a particles from laser-driven proton-boron fusion, Physical Review E 101, 013204-1-013204-13.
English Abstract for DE 102012001634 A1 (2013).
CH 391910 A, U.S. Pat. No. 3,216,077 A.
DE 102012001634 A1, English Abstract.
WO 2015144190 A1, US 20170125129 A1.

\* cited by examiner

ELIMINATION OF NEUTRONS FROM NUCLEAR REACTIONS IN A REACTOR, IN PARTICULAR CLEAN LASER BORON-11 FUSION WITHOUT SECONDARY CONTAMINATION

CROSS-REFERENCE TO RELATED APPLICATIONS

This application is a U.S. National Phase Application of PCT/EP2018/082520, filed Nov. 26, 2018, which claims priority from 10 2017 010 927.3, filed Nov. 27, 2017, the contents of which applications are incorporated herein by reference in their entireties for all purposes.

TECHNICAL FIELD

The invention relates to a method for the elimination of neutrons from fission, fusion or aneutronic nuclear reactions in a reactor, in particular for the elimination of neutrons from fusion reactions in a nuclear fusion reactor, such as a laser-driven nuclear fusion reactor operated with hydrogen and the boron isotope 11. The invention also relates to a nuclear reactor, in particular a laser nuclear fusion reactor, which is arranged for the generation of electrical energy by laser-based fusion of protons with the boron isotope 11. Applications of the invention exist in the generation of electrical energy.

TECHNICAL BACKGROUND

When explaining the state of the art, reference is made to the following publications:
[1] WO 2015/144190 A1;
[2] H. Hora, G. Korn, L. Giuffrida, D. Margarone, A. Picciotto, J. Krasa, K. Jungwirth, J. Ullschmied, P. Lalousis, S. Eliezer, G. H. Miley, S. Moustaizis and G. Mourou, Fusion energy using avalanche increased boron reactions for block ignition by ultrahigh power picosecond laser pulses. Laser and Particle Beams. 33, 607-619 (2015);
[3] H. Hora, S. Eliezer, N. Nissim and P. Lalousis. Non-thermal Laser Driven Plasma-Blocks for Proton Boron Avalanche Fusion as Direct Drive Option. Matter and Radiation at Extremes (Elsevier) 2, 177-189 (2017);
[4] H. Hora, Comment on Finkel-Report: Australian Government Commission headed by Chief Scientist Dr Alan Finkel 2017 on Energy (Report der Academy of Technological Science and Engineering (ATSE) Melbourne, Symposium Sydney Jan. 11, 2017);
[5] H. Hora *Laser Plasma Physics* 2nd ed 2016, SPIE Book Bellingham Wash., USA; and
[6] Shalom Eliezer, Heinrich Hora, Georg Korn, Noaz Nissim and Josè Maria Martinez-Val. Avalanche proton-boron fusion based on elastic nuclear collisions. Physics of Plasmas 23, 050704 (2016).

It is well known that a clean production of electrical energy avoids pollution of the earth's atmosphere by the combustion of carbonaceous fuel or the production of radioactive waste from nuclear fission reactors. A clean electric power generator is described in [1], primarily using the neutron-free fusion reaction of hydrogen and the isotope 11 of boron (HB11 fusion) by a non-thermal ignition with extreme laser pulses. The plasma acceleration for ignition is achieved by non-linear forces of the electromagnetic field of the laser pulses, combined with ultra-high magnetic fields to hold the reaction volume of the nuclear fusion together.

While HB11 fusion is absolutely neutron-free, a secondary reaction occurs by the primary helium nuclei (alpha particles) by reacting with the boron-11 nuclei present in the fuel, including a production of harmless, stable nitrogen and a neutron. This reaction is weak and is less than 0.1% of the number of HB11 reactions, and the energy of the neutrons of 0.85 MeV produced is comparatively very low. These neutrons decay with a half-life of 14 minutes into an electron and a proton. Until this decay, however, the neutrons can contribute in a dangerous way to radioactive waste. Because neutrons have no electrical charge, they can come close to and penetrate other atomic nuclei (so-called neutron capture), whereby a normally harmless stable atomic nucleus becomes a radioactive nucleus.

The HB11 reactor can practically be realized with available techniques, using petawatt laser pulses with high repetition rates. Boron fusion has always been considered particularly difficult and practically impossible. However, the goal of a "Clean Energy Target" solution without neutrons and without radioactive waste, as introduced by Finkel, always was of great interest (see [4]). Measurements of the HB11 reaction as the basis of the HB11 nuclear fusion reactor described below have so far been achieved with lasers (Belyaev et al. 2005 in Moscow, Labaune et al. 2013 in Paris and Picciotto et al. 2014 in Prague). However, based on the completely neutron-free reaction of hydrogen with boron-11 as the realization of the goal of an absolutely clean energy source, the mentioned limitation from a contaminating secondary reaction is known. The HB11 reaction, which is completely clean in the first step, produces the clean helium nuclei of alpha particles, but these react with the boron-11 nuclei in the fusion fuel and convert the boron-11 nuclei into stable nitrogen nuclei by splitting off a non-energy-rich neutron.

Radiation risks from neutrons or the consequences of the interaction of neutrons with atoms in reactor parts or in the vicinity of the reactor also exist in other nuclear reactions in fission, fusion or other a neutron nuclear reactors.

OBJECTIVE OF THE INVENTION

An objective of the invention is to provide an improved method for eliminating neutrons from fission, fusion or aneutronic nuclear reactions in a reactor, which avoids disadvantages and limitations of conventional methods and which in particular allows a reduction of the number of neutrons in the vicinity of the reactor and/or a reduction of interactions of neutrons with atoms in reactor parts or in the vicinity of the reactor. A further objective of the invention is to provide an improved nuclear reactor, in particular a nuclear fusion reactor, with which disadvantages and limitations of conventional techniques are avoided and which is characterized in particular by a reduction of the number of neutrons and neutron-atom interactions.

BRIEF SUMMARY OF THE INVENTION

These objectives are solved by a neutron elimination method and a nuclear reactor of the invention.

According to a first general aspect of the invention, the above objective is solved by a method for the elimination of neutrons from fission, fusion or aneutronic nuclear reactions in a reactor in which at least partially moderated neutrons are made to nuclearly react with tin.

According to a second general aspect of the invention, the above objective is solved by a reactor which is configured for energy conversion by means of fission, fusion or aneutronic nuclear reactions and for the generation of electric energy, the reactor comprising a neutron elimination device including tin and being arranged such that moderated neutrons are at least partially brought to nuclear reactions with the tin.

A third general aspect of the invention is the use of tin for eliminating neutrons generated as a result of fission, fusion or aneutronic nuclear reactions in a reactor. The neutrons produced by the primary reaction or by secondary reactions in the reactor are wholly or partly absorbed by tin, in particular in purely metallic or compound form (e.g. alloy).

The invention is based on the knowledge that neutron capture, which often produces a radioactively radiating nucleus from a harmless stable atomic nucleus, is uncritical for those elements which have as many different stable isotopes as possible. Among these elements, tin has proven to be particularly advantageous because of its high effective cross section.

The elimination of radiation-hazardous neutrons by their limited lifetime of 14 minutes half-life until decay into non-radioactively damaging electrons and protons (hydrogen nuclei) can be applied to all energy-producing nuclear reactors with fission or fusion and in particular to the following example of aneutronic nuclear fusion by means of "Laser Boron Fusion". This is the "Clean Energy Target" for innovations, which goes far beyond the previous initiatives of "renewable energy".

Preferably, by nuclear reactions with tin, neutrons transform tin nuclei by neutron capture into stable nuclei with a higher atomic weight. Advantageously, no radiating residues remain.

A laser-driven nuclear fusion reactor is particularly preferred, which works with hydrogen and the boron isotope 11 primarily without producing neutrons, whereby secondary neutrons produced by the reaction of alpha particles with boron isotope 11 are at least partially eliminated. As stated in [2], the number of unwanted neutrons, in particular in the HB11 nuclear fusion reactor, is comparatively very low and their energy relatively low. The reactor is preferably a laser-driven nuclear fusion reactor, which has a magnetic field device configured to hold a fusion fuel and to generate a magnetic field with a field strength greater than or equal to 1 kT in a cylinder-shaped reaction space, a fusion pulse laser source configured to emit fusion laser pulses, whose pulse duration is less than 10 ps and whose power is more than 1 petawatt and is configured to initiate nuclear fusion in the fusion fuel, and an energy conversion means for converting the energy released from the generated nuclei during nuclear fusion into power plant output, wherein the neutron elimination device is arranged as wall material of the reactor. The neutron elimination device preferably surrounds the reactor space of the laser-driven nuclear fusion reactor on all sides.

The laser-driven nuclear fusion reactor preferably has the properties of the nuclear fusion reactor described in [1]. Accordingly, WO 2015/144190 A1 is incorporated by reference in the present description of the invention with respect to the details of the construction of the nuclear fusion reactor and its operation, in particular with respect to the generation of the magnetic field for holding a fusion fuel and the design of the energy conversion device.

Advantageously, tin can be used in various forms to eliminate neutrons. According to a first variant, metallic tin is used, through which the neutrons produced primarily or subsequently during the nuclear reaction fly. Preferably, the neutron elimination device consists of pure tin. In this case, advantages can result from the high effectiveness of the neutron elimination. Alternatively, at least one compound of tin, e.g. at least one tin alloy, is used. In this case, advantages may result from the fact that the at least one tin compound can be used as a material for the manufacture of reactor parts, e.g. reactor walls.

Particularly preferred, the metallic tin or the at least one tin compound is used as wall material of the reactor. In other words, reactor walls surrounding a reactor space of the reactor may consist of the metallic tin or the at least one tin compound or be made layered with a support and a layer of the metallic tin or the at least one tin compound.

The range of fast neutrons, which normally travel long distances through materials, can be substantially reduced if they have elastic collisions with, for example, protons or deuterons. This so-called thermalization of fast neutrons can be done e. g. with water or heavy water or with solid or liquid paraffin of sufficient thickness. Accordingly, according to another preferred embodiment of the invention, it is provided that the neutrons lower their energy by elastic collisions when passing through a thermalizing liquid. Preferably, a thermalization device is provided which contains a thermalization liquid and which is arranged to reduce the energy of the neutrons by elastic collisions when passing through the thermalization liquid. Preferably, the thermalizing liquid includes protons, deuterons, carbon, oxygen and/or components thereof and/or metallic tin particles of more than one nanometer in size.

Advantageously, the thermalization device can fulfil a further function besides the deceleration function and can also be arranged as a heat exchanger for the transfer of energy, which is generated during operation of the reactor, to a heat exchange medium. During operation of the reactor, the thermalization liquid is heated and used for heat transfer to the heat exchange medium.

According to another preferred embodiment of the invention, the tin includes isotopes 114 to 119 and, with less than 0.01%, isotopes 112 and 122. This embodiment minimizes the probability of undesired nuclear reactions. Particularly preferred, the tin contains the isotopes 114, 115 and/or 116 in at least 99.9% purity each or mixtures thereof.

Particularly preferred, the neutron elimination device is configured in such a way that on the outer wall of the reactor, including a shielding layer, there are less neutron densities during power generation operation than are prescribed by a predetermined limit concentration for environmentally clean operation. This limit concentration results from estimates known per se from the literature.

In the following, essential features of the present invention are summarized:

1) Elimination of neutrons from fission, fusion and aneutronic fusion reactions, characterized in that at least partially moderated neutrons are brought to nuclear reactions with tin;
2) Elimination of neutrons from fission, fusion and aneutronic fusion reactions according to 1), characterized in that the neurons move through solid metallic tin or compounds;
3) Elimination of neutrons from fission, fusion and aneutronic fusion reactions according to 1) to 2), characterized in that metallic tin is used as the wall material of the reactor;
4) Elimination of neutrons from fission, fusion and aneutronic fusion reactions according to 1) to 3), characterized in that the neutrons reduce their energy by elastic collisions when passing through liquids containing protons, or deuterons, or carbon, or oxygen or components thereof;
5) Elimination of neutrons from fission, fusion and aneutronic fusion reactions according to 1) to 4), characterized in that the liquids contain metallic tin particles of more than nanometer size.

6) Elimination of neutrons from fission, fusion and aneutronic fusion reactions according to 1) to 5), characterized in that tin contains the isotopes 112 and 122 in less than 0.01% in addition to the isotopes 114 to 119.

7) Elimination of neutrons from fission, fusion and aneutronic fusion reactions according to 1) to 5), characterized in that the tin used contains the isotopes 114, 115 and/or 116 in each case in at least 99.9% purity or mixtures thereof;

8) Elimination of neutrons from fission, fusion and aneutronic fusion reactions according to 1) to 7), characterized in that on the outer wall of the reactor including the shielding layer during operation of the power generation there are less neutron densities than are prescribed by the limit concentration for environmentally clean operation.

BRIEF DESCRIPTION OF THE FIGURES

Further details and advantages of the invention are explained below with reference to the attached drawings, which show in.

PREFERRED EMBODIMENTS OF THE INVENTION

Features of preferred embodiments of the invention are described below, primarily with reference to a nuclear fusion reactor as defined in [1]. However, the invention is not limited to this nuclear fusion reactor, but is also applicable to other reactors which produce neutrons during operation. Details of the nuclear fusion reactor, such as the details of laser pulse sources, the physical principles of the HB11 reaction, the connection of the fusion reactor with further components of a power plant, in particular for the preparation and supply of the fusion fuel, for the control of the fusion reactor, for the protection of the environment against thermal influences and/or electric fields, are not described, since they can be realized by a skilled person, based on the knowledge of known fusion and plasma physics and conventional power plant technology, depending on the concrete application conditions of the invention. Reference is made by example to a fusion reactor with a single reaction chamber. However, the invention is not limited to this design. Rather, a fusion reactor can be provided with a plurality of reaction chambers, each with a magnetic field device for holding fusion fuel. The reaction chambers can be operated sequentially alternately in such a way that a continuous or quasi-continuous generation of electrical energy is possible.

Figure 1:
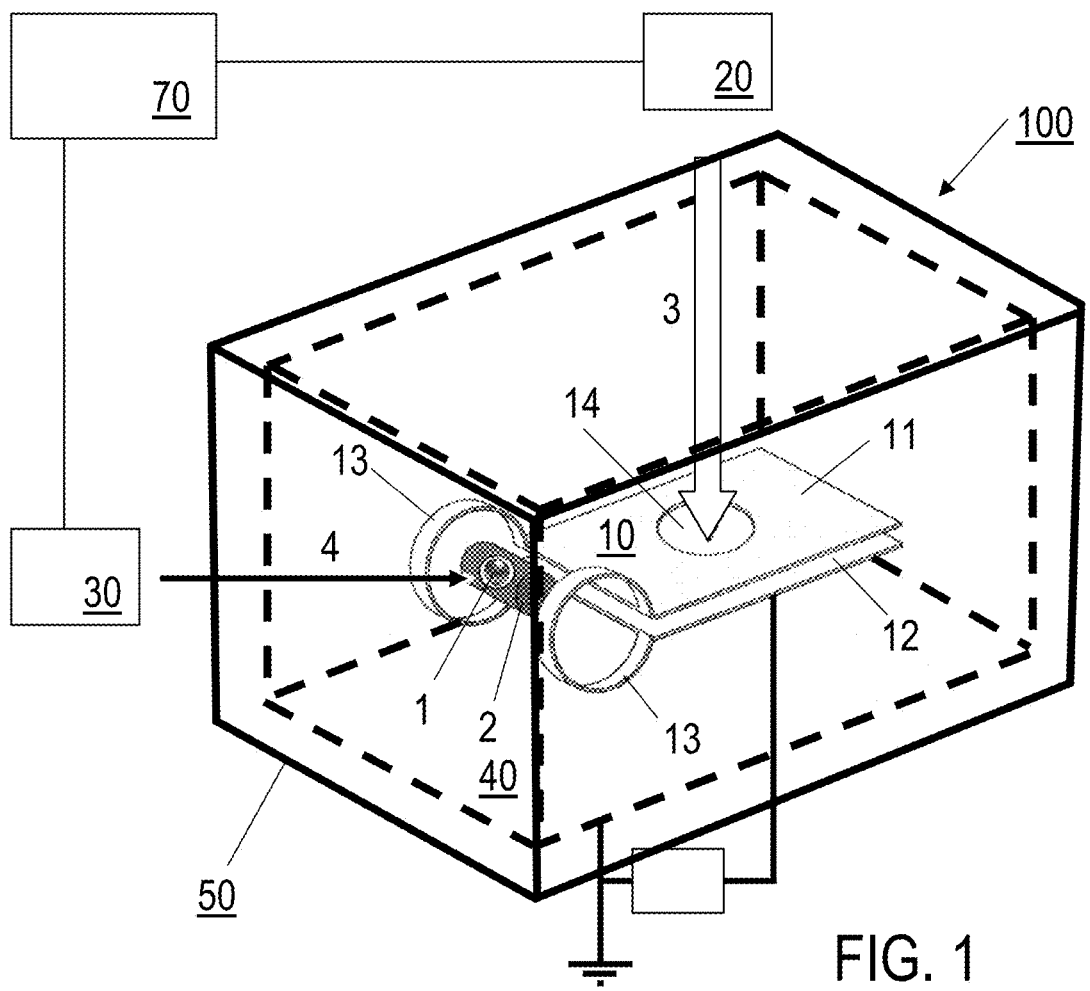
FIG. 1: a schematic illustration of an embodiment of the invention nuclear fusion reactor according to the invention.
Figure 2:
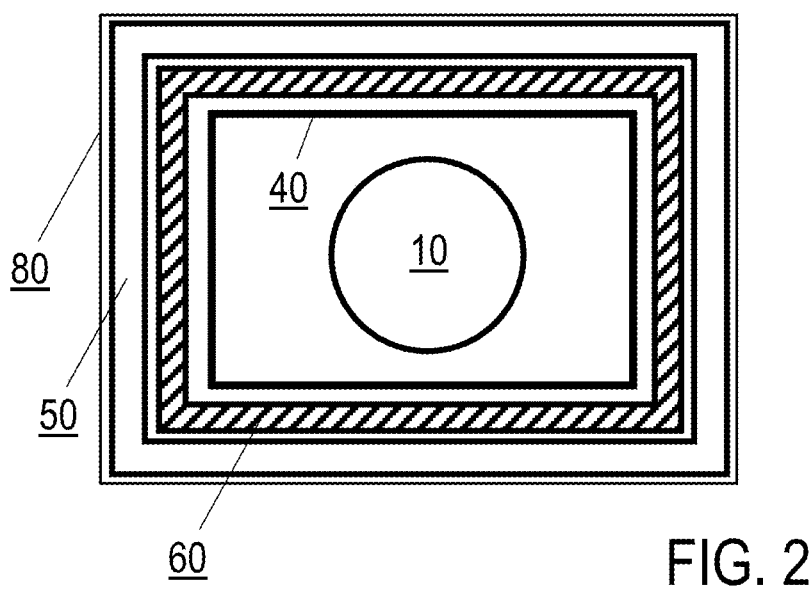
FIG. 2: a schematic illustration of a nuclear fusion reactor with a thermalization device.

The laser-driven nuclear fusion reactor described in [1] to [3] and illustrated in FIGS. 1 and 2 is based on the combination of ultra-high kilotesla magnetic fields combined with the non-thermal ignition of HB11 fusion reactions using laser pulses of picosecond duration and more than 30 petawatts of power, wherein for example 14 mg boron-11 releases an energy gain of 277 kWh every second. In contrast to the laser-driven deuterium-tritium nuclear fusion with 2 megajoule laser pulses of nanosecond duration with the laser NIF with spherical irradiation of 96 beams, the HB11 reactor operates with only one beam for non-thermal ignition by means of the extremely high, non-linear forces of the electrodynamic laser field. Relevant measurements at the PALS laser project in Prague have shown that the non-thermal method yields billions of times higher energy yields than the classical thermal reaction, which is in exact agreement with the theory (see [6]).

FIG. 1 shows a schematic illustration of an embodiment of the invention's nuclear fusion reactor 100, for example according to [1], which comprises a magnetic field device 10 for holding a fusion fuel 1 with a magnetic field in a cylindrical reaction chamber 2, a magnetic field pulse laser source 20 for emission of magnetic field laser pulses 3 (or: magnetic field-generating laser pulses), a fusion pulse laser source 30 for emission of fusion laser pulses 4 (or: block fusion laser pulses), an energy converter device 40 (shown dashed) for converting the energy released from the generated nuclei during nuclear fusion, and a neutron elimination device 50. The nuclear fusion reactor 100 preferably has a spherical structure as illustrated in FIG. 3 of [1].

The neutron elimination device 50 with a shielding layer 80 surrounds the magnetic field device 10 and the energy conversion device 40 on all sides in the form of a predominantly closed housing. The shape of the neutron elimination device 50 can be box-shaped or alternatively spherical as shown. The neutron elimination device 50 comprises a wall material comprising tin or a tin compound. The thickness of the tin or tin compound is selected in accordance with the operating conditions of the nuclear fusion reactor 100. The thickness is preferably selected such that the neutron number is reduced by the effect of the neutron elimination device to a negligible degree, in particular to a degree which avoids further nuclear reactions.

The magnetic field device 10 for generating a magnetic field with a strength of e.g. 4.5 kT in reaction chamber 2 comprises two parallel metal plates 11, 12, which are made of e.g. nickel, have a thickness of e.g. 2 mm and a characteristic extension of e.g. 3 cm. The metal plates 11, 12 are connected by electrical conductors forming two turns 13 of a coil. One of the metal plates 11 has a hole 14 through which the magnetic field laser pulses 3 with a duration of e.g. 1 ns to 2 ns and e.g. 10 kJ energy are irradiated. The plasma generated by each magnetic field laser pulse 3 generates a current pulse in the coils 13 with a magnetic field of a volume of cubic millimeters and a duration of several ns.

The hole 14 is a circular opening in the upper metal plate 11 shown in FIG. 1. The diameter and optionally also the geometrical shape of hole 14 are selected depending on the properties, in particular the intensity, diameter and profile of the magnetic field laser pulses 3. For example, the diameter of hole 14 is 5 mm. Deviating from the circular shape, an elliptical shape can be provided, for example. The hole 14 can be optimized to maximize the magnetic field for the highest possible fusion yield.

The second metal plate 12, which is opposite to the hole 14, can be provided with an absorption layer which serves to reduce the optical reflection of the magnetic field laser pulses 3 and to increase the dielectric properties of the capacitor formed by the metal plates 11. Preferably, the absorption layer (not shown) is arranged on the entire surface of the metal plate 12 and is preferably formed of a foam material, for example polyethylene. The foam material is selected so that after laser irradiation an electron density distribution is formed as a double Rayleigh profile.

The magnetic field laser pulses 3 are generated with the magnetic field pulse laser source 20 shown schematically, which contains, for example, a Nd-YAG laser and further optical components (not shown) for directing the magnetic field laser pulses 3 towards the magnetic field device 10. Optionally, the magnetic field laser pulses 3 of a duration in the nanosecond range can be shortened in time by using an iodine laser with a pulse length of 100 ps and/or by shorter laser pulses after CPA power increase. Advantageously, the magnetic field generated by the magnetic field device 10 can thus be amplified.

The fusion pulse laser source 30 is configured to generate the fusion laser pulses 4 with a duration of less than 5 ps and an intensity above $10^{19}$ W/cm$^2$. The fusion laser pulses 4 preferably have a contrast ratio of at least $10^6$ for a duration of less than 5 ps prior to the arrival of the fusion laser pulses 4 on the fusion fuel 1. Furthermore, the fusion laser pulses 4 preferably have an intensity distribution which exhibits less than 5% fluctuations over the beam cross-section, except in an outer 5% edge region of the beam cross-section. This is advantageous for optimizing the block ignition of the fusion reaction in fusion fuel 1. The mentioned intensity distribution is achieved, for example, by a fusion pulse laser source 30, which has a bundle of fiber amplifiers, each individual fiber having a single mode emission. Furthermore, the fusion pulse laser source 30 contains a pulsed laser, such as a solid-state pulsed laser, for the generation of ps laser pulses.

The magnetic field pulse laser source 20 and the fusion pulse laser source 30 are coupled to a control device 70. The control device 70 is configured in such a way that the magnetic field laser pulses 3 and the fusion laser pulses 4 are synchronized in time with one another. In reaction chamber 2, the maximum magnetic field is generated immediately before each of the fusion laser pulses 4 arrives at fusion fuel 1.

The fusion fuel 1 is a solid-state dense, cylindrical body based on HB11, for example with a length of 1 cm and a diameter of 0.2 mm. The surface of the fusion fuel 1 carries a cover layer at the laser interaction area with a thickness of three laser vacuum wavelengths. The cover layer consists of elements with an atomic weight higher than 100, for example silver. The cover layer improves the pulse transmission for generating the fusion flame in fusion fuel 1. The fusion fuel 1 is held in the magnetic field device by quartz filaments.

The energy converter device 40 generally comprises an electrically conductive component (shown schematically as a dashed line in FIG. 1, see also FIG. 3), which surrounds the magnetic field device 10 on all sides. The magnetic field device 10 is supported inside the energy converter device 40 (carrier not shown in FIG. 1, see e.g. carrier bar 44 in FIG. 3). The energy converter device 40 is preferably connected to ground potential, while a negative high voltage, for example −1.4 MV, is applied to the magnetic field device 10 by a voltage source 15. The energy converter device 40 is arranged to capture high-energy He nuclei (alpha particles) released during the fusion reaction of fusion fuel 1 and to convert them into a discharge current by means of voltage direct current transmission (HVDC) [1]. The discharge current provides the electrical energy into which the energy released during the fusion reaction is converted.

In deviation from the illustration in figure, the direction of incidence of the magnetic field laser pulses 3 can be rotated by an angle of up to 80° between perpendicular incidence in the plane defined by the perpendicular incidence direction and the normal of the magnetic field, the rotation being in the plane oriented parallel to the coils 13.

The neutron elimination device 50 may be provided with a thermalization device 60 on its side facing the fusion fuel 1, as shown schematically in FIG. 2. The thermalization device 60 contains a thermalization liquid, such as liquid paraffin.

An HB11 nuclear fusion reactor which is sufficiently clean under practical conditions can be obtained according to the invention in particular by making the spherical reactor vessel of the nuclear fusion reactor from pure tin, or—which is fully economically feasible—from tin isotopes 114 or with 115, and the frequent 116. The neutrons originating from nitrogen convert the tin nuclei into clean, stable nuclei with a higher atomic weight by neutron capture. In order to slow down the neutrons produced from flying too large, thermalization is applied in the thermalization device 60 (FIG. 2) using an about 10 cm thick liquid of water or of solid paraffin or of paraffin oil. With the further outer jacket of a tin layer of the neutron elimination device 50, the nuclear fusion reactor 100 is then operating as a perfectly sufficient clean energy source. With the liquid intermediate layer of the thermalization device 60, also the heat exchange can be conducted, if the energy of the helium nuclei should be available only by deceleration in the reactor wall and is not possible in preferred manner by energy conversion in electrostatic fields between the reactor center, in particular the center of the sphere, and the reactor wall, in particular the wall of the sphere.

For the tests of the nuclear fusion reactor and for the implementation of the development of the reactor components, the very sensitive measurement of the neutrons from the formation of the nitrogen nuclei can be used, since the measurement of the HB11 reaction is more difficult and less accurate to handle.

The features of the invention disclosed in the above description, drawings and claims may be relevant to the realization of the invention in its various forms either individually, in combination or in sub-combination.

The invention claimed is:

1. A method for eliminating neutrons from fusion or aneutronic nuclear reactions in a fusion reactor, said method comprising:
    providing a reactor comprising a reactor space, a neutron elimination device and a thermalization device;
    providing a fuel in the reactor;
    conducting the nuclear reactions within the reactor space, wherein the nuclear reactions generate free neutrons;
    reducing energy of at least some of the free neutrons by elastic collisions as the neutrons pass through a thermalization liquid in the thermalization device to provide moderated neutrons; and
    reacting the moderated neutrons with tin of the neutron elimination device to transform tin nuclei of the tin by neutron capture into stable nuclei with a higher atomic weight than tin,
    wherein the thermalization liquid contains protons, deuterons, carbon, oxygen, or compositions thereof and/or contains metallic tin particles of more than nanometer size.

2. The method according to claim 1, wherein the reactor is a laser-driven nuclear fusion reactor operating with hydrogen and boron isotope 11, and wherein the conducting the nuclear reactions within the reactor space comprises generating the free neutrons by reaction of alpha particles with boron isotope 11 and the reacting the moderated neutrons with tin at least partially eliminates the free neutrons generated by the reaction of alpha particles with boron isotope 11.

3. The method according to claim 1, wherein the moderated neutrons move through the tin of the neutron elimination device, wherein said tin is a solid metallic tin or at least one compound of tin.

4. The method according to claim 1, wherein the neutron elimination device is a wall comprised of metallic tin or at least one compound of tin.

5. The method according to claim 1, wherein the thermalization liquid is additionally used as a heat exchanger for transferring energy generated during operation of the reactor.

6. The method according to claim 1, wherein the tin contains isotopes 114 to 119 and contains less than 0.01% of isotopes 112 and 122.

7. The method according to claim 1, wherein the tin contains at least one of isotopes 114, 115, and 116 each in at least 99.9% purity or mixtures thereof.

8. The method according to claim 1, wherein the reactor further comprises an outer wall including a shielding layer, and the method further comprises preventing development of a neutron density in the outer wall exceeding a maximum neutron density concentration required for environmentally clean operation.

9. A method for eliminating neutrons from fusion or aneutronic nuclear reactions in a fusion reactor, said method comprising:
   providing a reactor comprising a reactor space, a neutron elimination device and a thermalization device;
   providing a fuel in the reactor;
   conducting the nuclear reactions within the reactor space, wherein the nuclear reactions generate free neutrons;
   reducing energy of at least some of the free neutrons by elastic collisions as the neutrons pass through a thermalization liquid in the thermalization device to provide moderated neutrons; and
   reacting the moderated neutrons with tin of the neutron elimination device to transform tin nuclei of the tin by neutron capture into stable nuclei with a higher atomic weight than tin,
   wherein the thermalization liquid is additionally used as a heat exchanger for transferring energy generated during operation of the reactor.

* * * * *